(12) United States Patent
Wu et al.

(10) Patent No.: US 12,507,645 B2
(45) Date of Patent: Dec. 30, 2025

(54) WATER CULTURE DEVICE FOR PEONY

(71) Applicant: YANGZHOU UNIVERSITY, Yangzhou (CN)

(72) Inventors: Yanqing Wu, Yangzhou (CN); Yuhan Tang, Yangzhou (CN); Linling Yan, Yangzhou (CN); Daqiu Zhao, Yangzhou (CN); Jun Tao, Yangzhou (CN); Lei Huang, Yangzhou (CN); Jiasong Meng, Yangzhou (CN)

(73) Assignee: Yangzhou University, Yangzhou (CN)

( * ) Notice: Subject to any disclaimer, the term of this patent is extended or adjusted under 35 U.S.C. 154(b) by 1 day.

(21) Appl. No.: 18/795,473

(22) Filed: Aug. 6, 2024

(65) Prior Publication Data

US 2025/0048981 A1 Feb. 13, 2025

(51) Int. Cl.
*A01G 31/04* (2006.01)

(52) U.S. Cl.
CPC .................................. *A01G 31/045* (2013.01)

(58) Field of Classification Search
CPC .... A01G 31/00; A01G 31/02; A01G 31/0233; A01G 31/042; A01G 31/045
See application file for complete search history.

(56) References Cited

U.S. PATENT DOCUMENTS

| 11,122,749 | B2* | 9/2021 | Villaflores | A01G 9/246 |
| 2022/0240460 | A1* | 8/2022 | Ng | A01G 31/02 |

FOREIGN PATENT DOCUMENTS

| CN | 114847151 A | * | 8/2022 | A01G 31/02 |
| CN | 114982616 A | * | 9/2022 | A01G 31/00 |
| CN | 116473012 A | * | 7/2023 | A01K 63/003 |

* cited by examiner

*Primary Examiner* — Magdalena Topolski
*Assistant Examiner* — Katherine Anne Kloecker
(74) *Attorney, Agent, or Firm* — WCF IP

(57) ABSTRACT

A water culture device for peony is provided. The water culture device for peony includes an incubator. The incubator is internally provided with a sliding rack at a middle position. A servo motor is arranged on a right side of the incubator. Second rotating shaft levers are arranged on left and right sides of the incubator. Since the locating clips on the regulating levers and the planting baskets on the sliding rack are used cooperatively, the peony plants can be blossomed and positioned. Moreover, a downward putting action of the planting basket and a location clamping action of the locating clip are combined together and performed in one time through mechanical transmission, so that the trouble of stepwise operation is omitted, and the culture efficiency of peony plants is effectively promoted.

10 Claims, 9 Drawing Sheets

WATER CULTURE DEVICE FOR PEONY

CROSS-REFERENCE TO RELATED APPLICATION

This patent application claims the benefit and priority of Chinese Patent Application No. 202311007005.2 filed with the China National Intellectual Property Administration on Aug. 10, 2023, the disclosure of which is incorporated by reference herein in its entirety as part of the present application.

TECHNICAL FIELD

The present disclosure relates to the technical field of flower planting, in particular to a water culture device for peony.

BACKGROUND

Peony is a Paeonia plant, and is a deciduous shrub with a perennial rootstock. The stems of peony are up to 2 meters in height, and the branches of peony are short and thick. Peony can be cultured with water, which is a novel maintenance method. Before water culture, a strong peony plant with a good growth tendency can be selected, and such plant is more conducive to be cultured with water to ensure later growth.

For example, Chinese Patent Application No. 202121073046.8 discloses a water culture device for peony. The water culture device for peony includes an incubator filled with a nutrient solution. The top of the incubator is open. The incubator is provided with a plant separating mechanism, so that a gap is formed between adjacent peony plants. The plant separating mechanism includes a stem separating mechanism and a root separating mechanism. The stem separating mechanism is arranged on the top of the incubator, and the root separating mechanism is arranged inside the incubator. The root separating mechanism includes a plurality of telescopic units, and the telescopic units are regulated through regulating units mounted on the stem separating mechanism, so that the lengths of the telescopic units are adaptive to the root heights of the peony plants, thus the root systems of the peonies can be separated to prevent the root systems of the peonies from being intertwined together.

The operation process is relatively troublesome and the culture efficiency of peony is affected since the planting baskets usually need to be put in and taken out manually and the peony plants are bundled and positioned simultaneously. and the workload of operators is increased since the water volume inside the incubator needs to be monitored in real time and water is injected according to the water volume during use of the existing water culture device for peony.

SUMMARY

For this purpose, the present disclosure provides a water culture device for peony so as to solve the problems that the operation process is relatively troublesome since the planting baskets usually need to be put in and taken out manually and the peony plants are bundled and positioned simultaneously, and the workload of operators is increased since the water volume inside the incubator needs to be monitored in real time and water is injected according to the water volume during use of the existing water culture device for peony.

The present disclosure provides a water culture device for peony, including an incubator. The incubator is internally provided with a sliding rack at a middle position. A servo motor is arranged on a right side of the incubator. Second rotating shaft levers are arranged on left and right sides of the incubator, and the two second rotating shaft levers are symmetrically distributed. The incubator is internally provided with two regulating levers which are located on front and rear sides of the sliding rack respectively. Three locating clips are arranged on each of opposite inner sides of the two regulating levers, and locating clips on the front and rear sides are symmetrically distributed. A back of the incubator is provided with a water storage barrel. Side frames are arranged on the left and right sides of the incubator, and the second rotating shaft levers are located inside the side frames. A bottom frame is arranged at a bottom of the incubator, and the servo motor is fixedly connected to the bottom frame through bolts.

Furthermore, two limit frames are arranged on inner walls of the left and right sides of the incubator, the two limit frames are symmetrically distributed, limit sliding chutes are arranged on opposite inner sides of the limit frames, first guide through slots are formed in the left and right sides of the incubator, and the first guide through slots are located at middle positions of the two limit frames.

Furthermore, three planting baskets are arranged on the sliding rack, each of the planting baskets is located below corresponding ones of the locating clips, connecting blocks are arranged at left and right ends of the sliding rack, the two connecting blocks are symmetrically distributed, threaded sliding sleeves are arranged on ends of the connecting blocks, and limit sliding holes are formed in portions, close to both ends, of the sliding rack.

Furthermore, a first rotating shaft lever is arranged on a rotating shaft of the servo motor, the first rotating shaft lever is located inside the bottom frame, the first rotating shaft lever is rotatably connected with the bottom frame through a bearing seat, two driving bevel gears are arranged on the first rotating shaft lever, and the two driving bevel gears are symmetrically distributed.

Furthermore, the second rotating shaft levers are rotatably connected with the incubator through bearing seats, tops of the second rotating shaft levers are provided with regulating screws, the sliding rack is slidably connected with first guide through slots of the incubator through the connecting blocks, the threaded sliding sleeves sleeve the regulating screws, driven bevel gears are arranged at bottoms of the second rotating shaft levers, and the driven bevel gears are meshed with the driving bevel gears.

Furthermore, two limit sliding blocks are arranged on opposite outer sides of the two regulating levers, the regulating levers are slidably connected with the limit sliding chutes of the limit frames through the limit sliding blocks, two first limit round rods are arranged on the opposite inner sides of the two regulating levers, first compression springs sleeves the first limit round rods, sliding rods are arranged on left and right sides of each of the first limit round rods, when the regulating levers are in connection with the sliding rack, positions of the first limit round rods correspond to positions of the limit sliding holes, the first compression springs are supported between the regulating levers and the sliding rack, and the first limit round rods are slidably inserted in the sliding rack.

Furthermore, two limit inserted rods are arranged on one side of each of the locating clips, the two limit inserted rods are symmetrically distributed, a second limit round rod is arranged on the one side of the each of the locating clips, a second compression spring sleeves the second limit round rod, the limit inserted rods and the second limit round rod slidably run through a corresponding one of the regulating levers simultaneously, and the second compression spring is supported between the each of the locating clips and the corresponding one of the regulating levers.

Furthermore, a fixed seat is arranged below the water storage barrel, the fixed seat is fixedly connected with the incubator, a connecting water pipe is arranged at a bottom of the water storage barrel, a water outlet pipe is arranged at a bottom of the connecting water pipe, and a floating ball is arranged below the water outlet pipe.

Furthermore, the water outlet pipe is formed with a cylindrical through cavity, two second guide through slots are formed in a side wall of the water outlet pipe, the two second guide through slots are symmetrically distributed, the through cavity of the water outlet pipe is internally provided with a butt sleeve, and the bottom of the butt sleeve is formed with a conical cavity.

Furthermore, the floating ball is provided with a connecting rod, a top of the connecting rod is provided with a regulating round rack, two guide sliding blocks are arranged on a periphery of the regulating round rack, the two guide sliding blocks are symmetrically distributed, the regulating round rack is arranged inside the water outlet pipe, the regulating round rack is slidably connected with second guide through slots through the guide sliding blocks, a top of the regulating round rack is provided with a support pillar, a top of the support pillar is provided with a butt plug, and the butt plug is matched with the conical cavity of the butt sleeve.

The device has the following beneficial effects.

Firstly, according to the present disclosure, the servo motor provides power to drive the first rotating shaft lever to rotate. The second rotating shaft lever is driven to rotate with the transmission of the driving bevel gear and the driven bevel gear. Through the mutual cooperation of the threaded sliding sleeve and the regulating screw, the sliding rack can be driven to slide up and down along the first guide through slot, and then the planting basket is driven to be regulated up and down. The processes of putting peony plants into water and taking peony plants out of water can be controlled, so that the troubles of manually taking peony plants out of water and putting peony plants into water are omitted, and the device is simple in structure and convenient to use and operate.

Secondly, in the present disclosure, since the position of the first limit round rod corresponds to the position of the limit sliding hole, the first compression spring is supported between the regulating lever and the sliding rack, and the first limit round rod is slidably inserted in the sliding rack, the two regulating levers can be driven to slide up and down to be regulated at the same time in the process that the sliding rack slides up and down. Moreover, the incubator is internally provided with a limit frame. In coordination with the structural features of the limit frame and the limit sliding chute, the limit frame can be folded towards the middle part when the two regulating levers slide downwards. Through the mutual cooperation of the limit inserted rod and the second compression spring with the regulating lever, the peony plants can be stably clamped by the locating clips on the front and rear sides, so that manual bundling location for the peony plants is omitted, and the peony plants are ensured to be in a vertical state effectively.

Thirdly, in the present disclosure, since the locating clips on the regulating levers and the planting baskets on the sliding rack are used cooperatively, the peony plants can be blossomed and positioned. Moreover, a downward putting action of the planting basket and a location clamping action of the locating clip are combined together and performed in one time through mechanical transmission, so that the trouble of stepwise operation is omitted, and the culture efficiency of peony plants is effectively promoted.

Fourth, in the present disclosure, since the floating ball floats on the liquid level of culture water, when the culture water inside the incubator is reduced, the floating ball can descend along with the liquid level, so that the regulating round rack slides downwards to be regulated along the second guide through slot. At the same time, the butt plug is separated from the conical cavity of the butt sleeve, the plugging of the butt sleeve can be relieved to realize automatic water injection of the water storage barrel into the incubator. The water volume inside the incubator does not need to be monitored, and the trouble of manual water injection is omitted.

BRIEF DESCRIPTION OF THE DRAWINGS

To describe technical schemes in embodiments of the present disclosure more clearly, the following briefly describes the accompanying drawings in the embodiments.

The accompanying drawings in the following description only relate to some embodiments of the present disclosure, and are not intended to limit the present disclosure.

In the accompanying drawings:

FIG. 1 is an isometric schematic diagram of an integral structure in an embodiment of the present disclosure.

FIG. 2 is a rotating view schematic diagram of the integral structure of FIG. 1 without a side frame and an bottom frame in an embodiment of the present disclosure.

FIG. 3 is a structural schematic diagram of an incubator in an embodiment of the present disclosure.

FIG. 4 is a structural schematic diagram of a sliding rack, a servo motor, a second rotating shaft lever, a regulating lever and a locating clip in an embodiment of the present disclosure.

FIG. 5 is a structural schematic diagram of the sliding rack, the regulating lever and the locating clip in an embodiment of the present disclosure.

FIG. 6 is an explosive structural schematic diagram of the sliding rack, the regulating lever and the locating clip in an embodiment of the present disclosure.

FIG. 7 is a structural schematic diagram of a water storage barrel and a floating ball in an embodiment of the present disclosure.

FIG. 8 is an explosive structural schematic diagram of a water outlet pipe and the floating ball in an embodiment of the present disclosure.

FIG. 9 is a cross-sectional structural schematic diagram of the water outlet pipe in an embodiment of the present disclosure.

Figure 1:
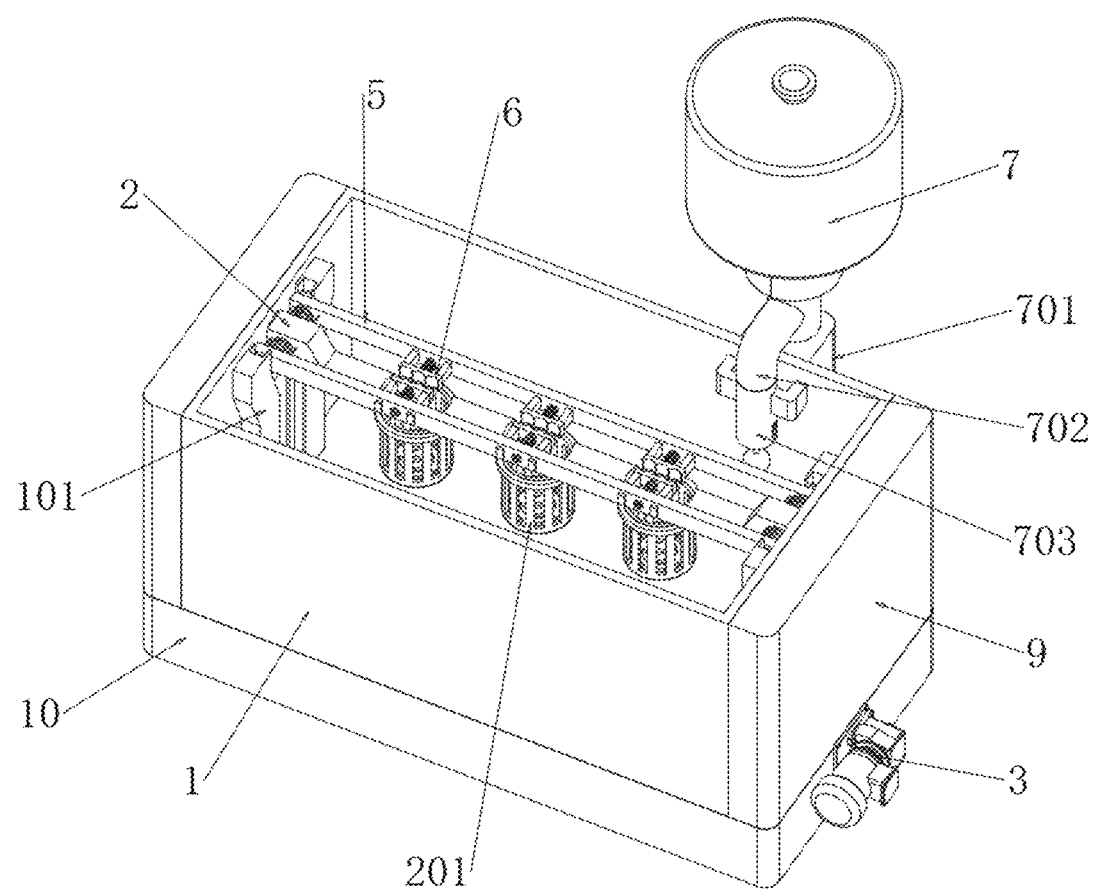
Figure 2:
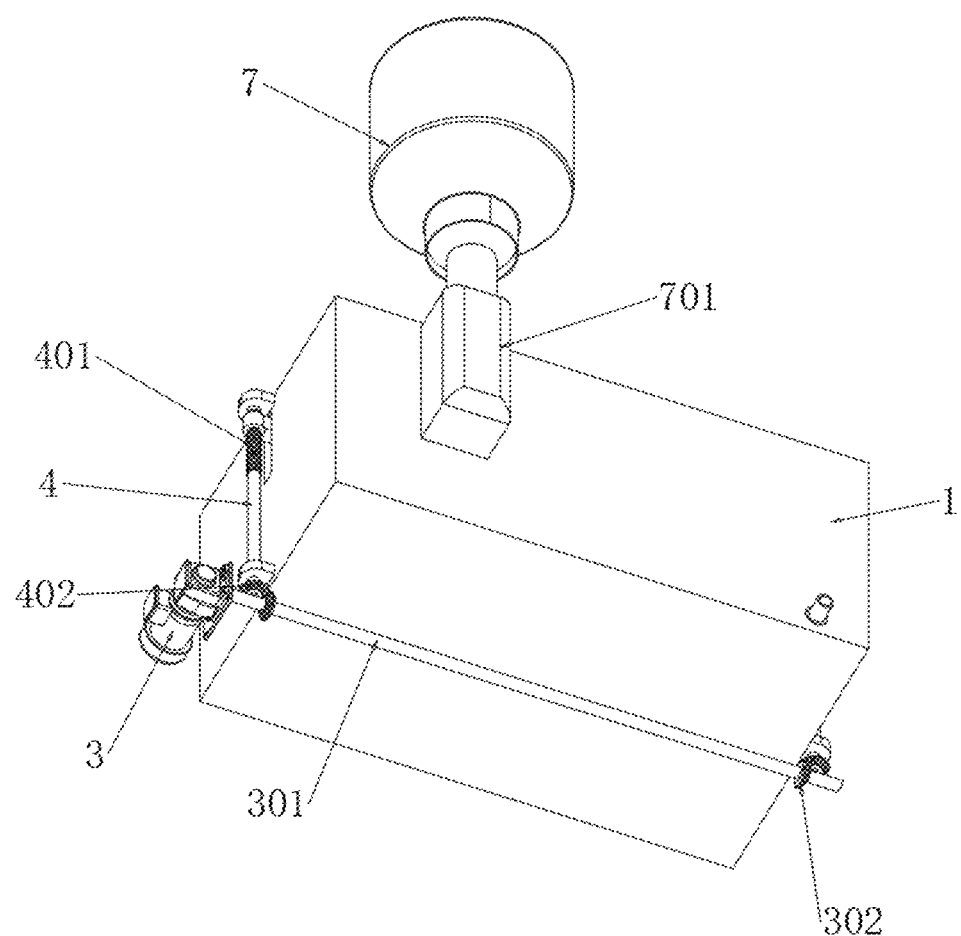
Figure 3:
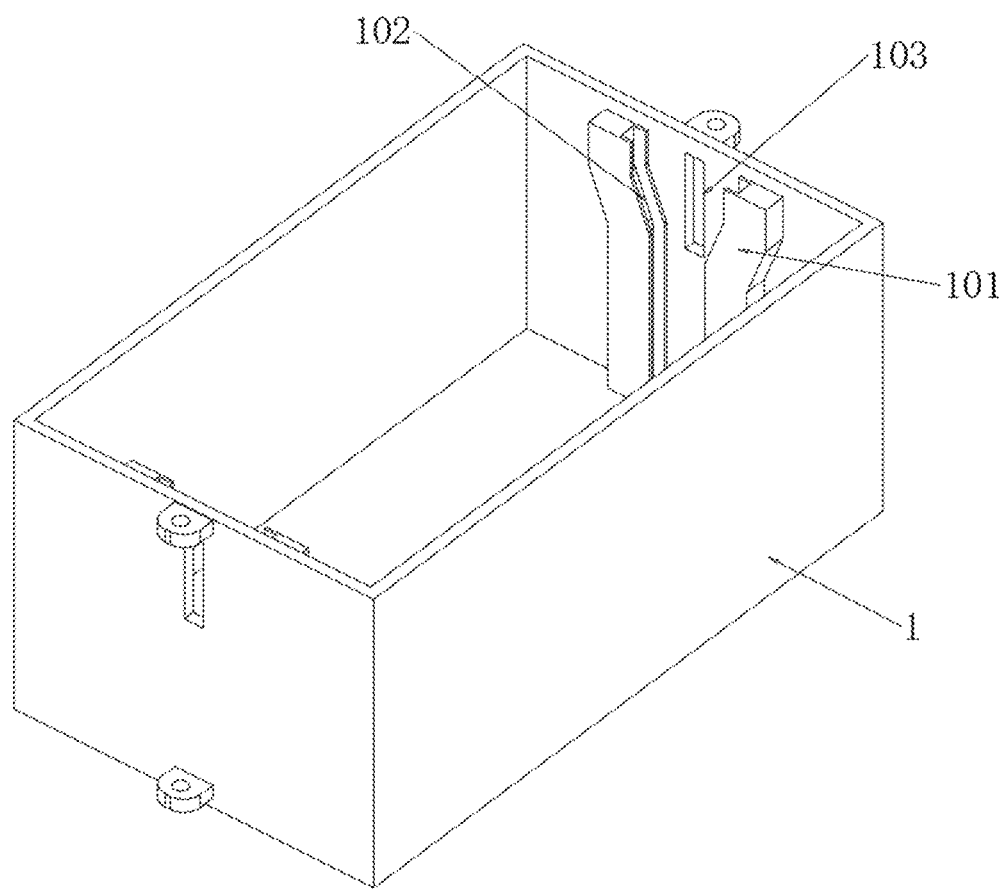
Figure 4:
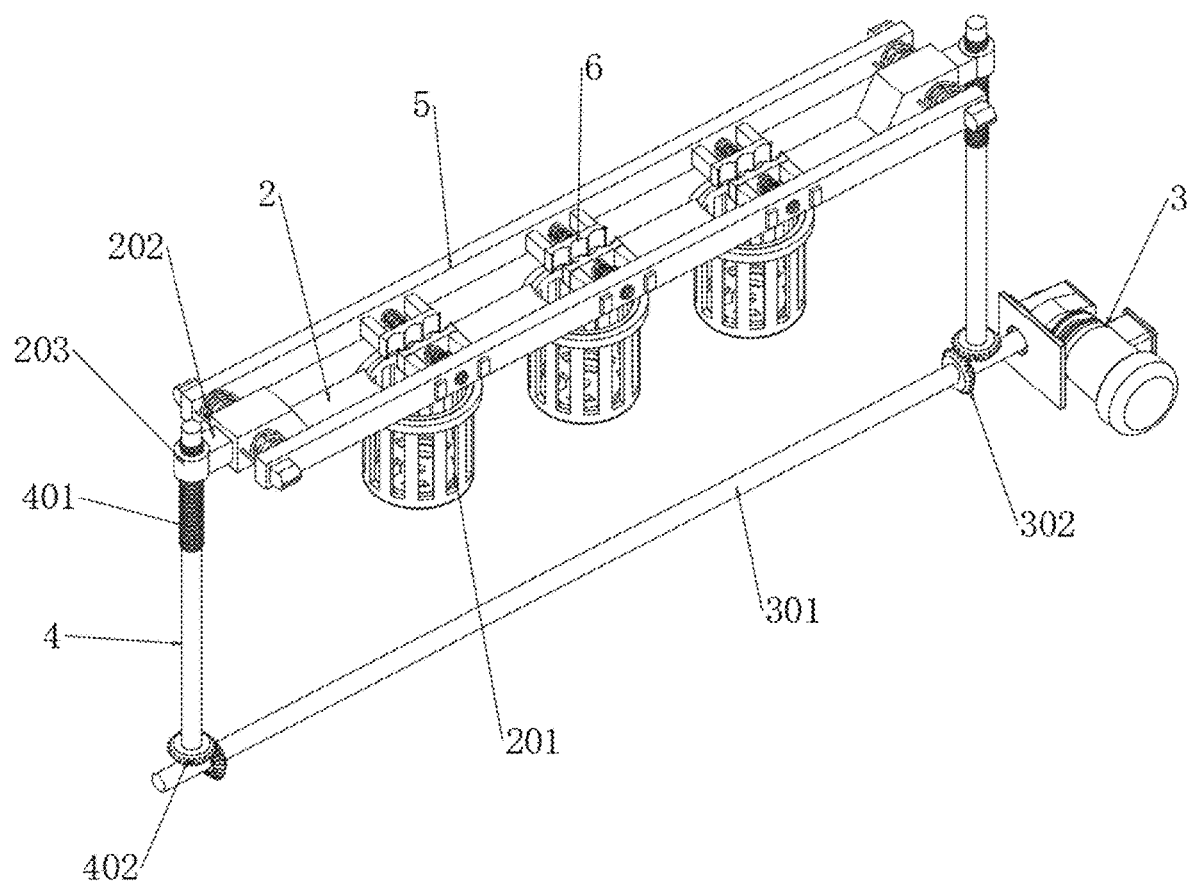
Figure 5:
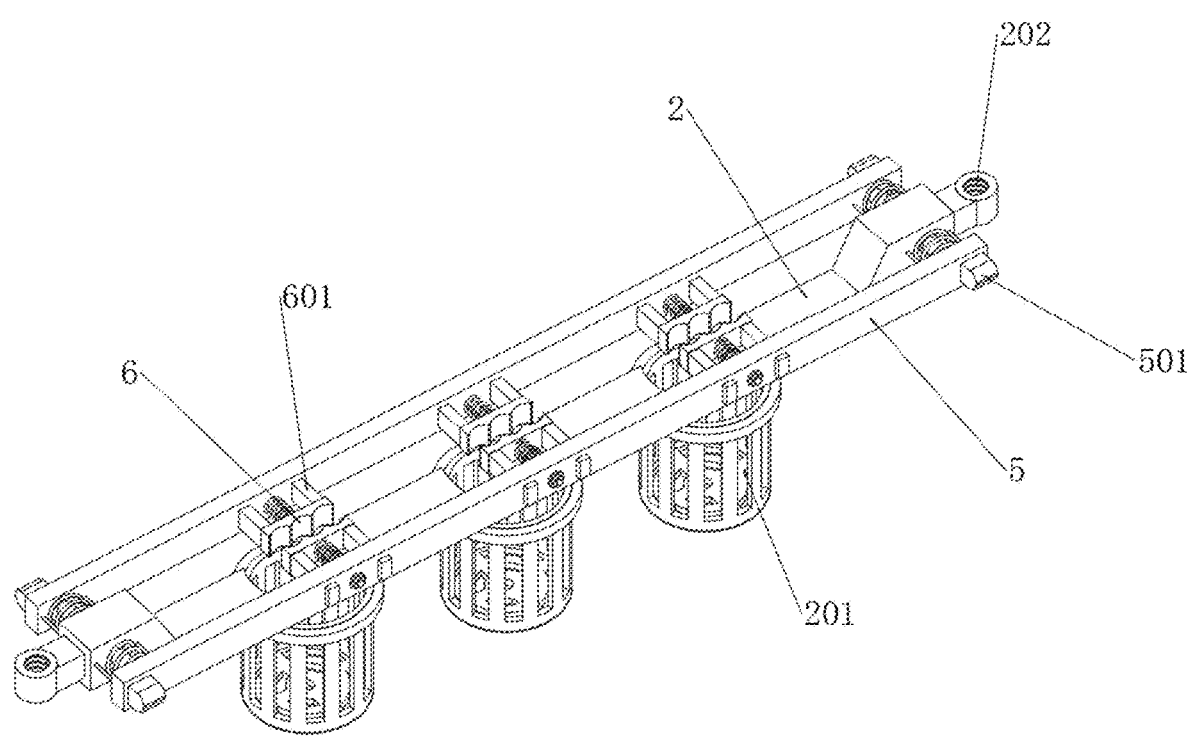
Figure 6:
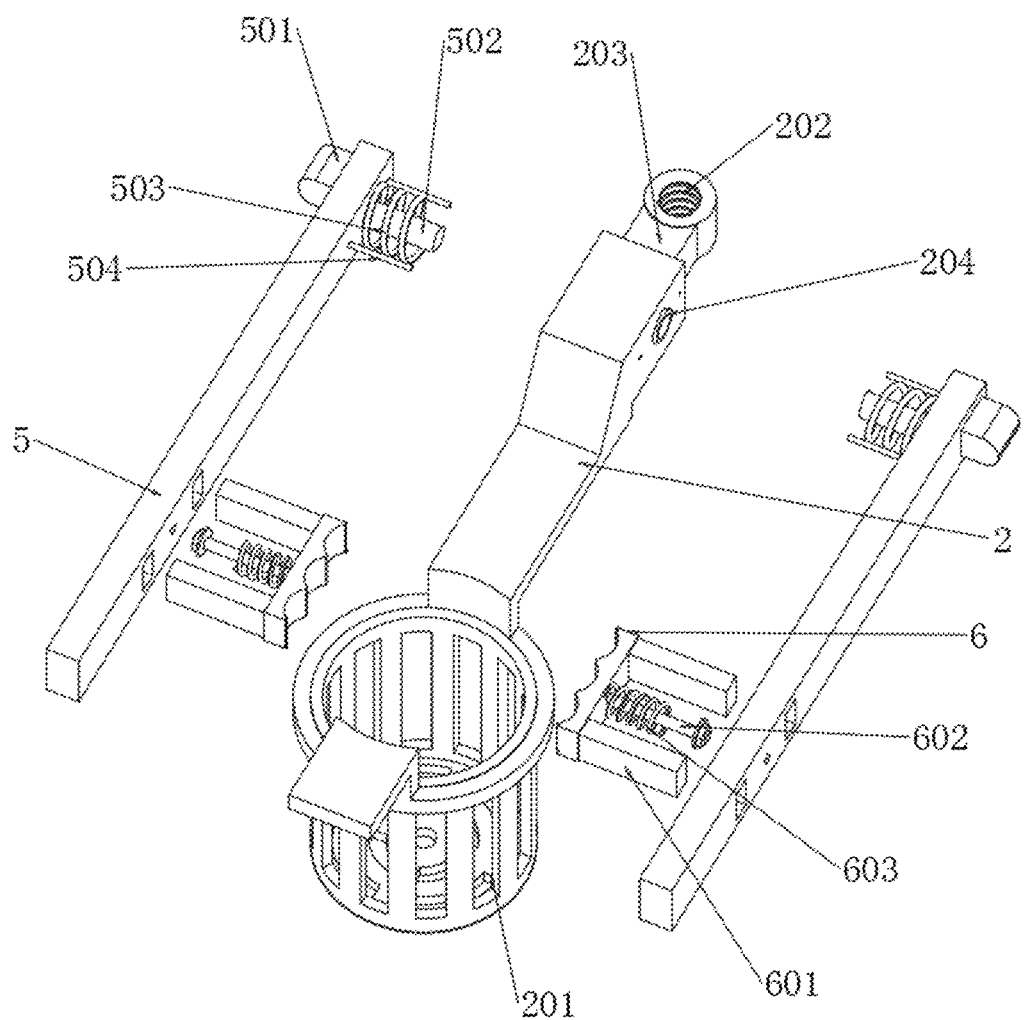

Reference numerals in the accompanying drawings:
1 incubator; 101 limit frame; 102 limit sliding chute; 103 first guide through slot; 2 sliding rack; 201 planting basket; 202 connecting block; 203 threaded sliding sleeve; 204 limit sliding hole; 3 servo motor; 301 first rotating shaft lever; 302 driving bevel gear; 4 second rotating shaft lever; 401 regulating screw; 402 driven bevel gear; 5 regulating lever; 501 limit sliding block; 502 first limit round rod; 503 first compression spring; 504 sliding rod; 6 locating clip; 601 limit inserted rod; 602 second limit round rod; 603 second compression spring; 7 water storage barrel; 701 fixed seat; 702 connecting water pipe; 703 water outlet pipe; 704 second guide through slot; 705 butt sleeve; 8 floating ball; 801 connecting rod; 802 regulating round rack; 803 guide sliding block; 804 support pillar; 805 butt plug; 9 side frame; and 10, bottom frame.

DETAILED DESCRIPTION OF THE EMBODIMENTS

To make the purpose, solutions, and advantages of the embodiments of the present disclosure clearer, the following clearly and completely describes the technical solutions of the embodiments of the present disclosure with reference to the accompanying drawings in the embodiments of the present disclosure. Unless otherwise specified, the terms used herein have ordinary meanings in the art. Same reference numerals in the accompanying drawings represent same components.

Embodiment I

Referring to FIG. 1 to FIG. 9, the present disclosure provides a water culture device for peony, including an incubator 1. The incubator 1 is internally provided with a sliding rack 2 at a middle position; a servo motor 3 is arranged on a right side of the incubator 1; second rotating shaft levers 4 are arranged on left and right sides of the incubator 1, and the two second rotating shaft levers 4 are symmetrically distributed; the incubator 1 is internally provided with two regulating levers 5 which are located on front and rear sides of the sliding rack 2 respectively; three locating clips 6 are arranged on each of opposite inner sides of the two regulating levers 5, and locating clips 6 on the front and rear sides are symmetrically distributed; a back of the incubator 1 is provided with a water storage barrel 7; side frames 9 are arranged on the left and right sides of the incubator 1, and the second rotating shaft levers 4 are located inside the side frames 9; a bottom frame 10 is arranged at a bottom of the incubator 1, and the servo motor 3 is fixedly connected to the bottom frame 10 through bolts.

Two limit frames 101 are arranged on inner walls of the left and right sides of the incubator 1, the two limit frames 101 are symmetrically distributed, limit sliding chutes 102 are arranged on opposite inner sides of the limit frames 101, first guide through slots 103 are formed in the left and right sides of the incubator 1, and the first guide through slots 103 are located at middle positions of the two limit frames 101.

Three planting baskets 201 are arranged on the sliding rack 2, each of the planting baskets 201 is located below corresponding ones of the locating clips 6, connecting blocks 202 are arranged at left and right ends of the sliding rack 2, the two connecting blocks 202 are symmetrically distributed, threaded sliding sleeves 203 are arranged on ends of the connecting blocks 202, and limit sliding holes 204 are formed in portions, close to both ends, of the sliding rack 2.

A first rotating shaft lever 301 is arranged on a rotating shaft of the servo motor 3, the first rotating shaft lever 301 is located inside the bottom frame 10, the first rotating shaft lever 301 is rotatably connected with the bottom frame 10 through a bearing seat, two driving bevel gears 302 are arranged on the first rotating shaft lever 301, and the two driving bevel gears 302 are symmetrically distributed.

The second rotating shaft levers 4 are rotatably connected with the incubator 1 through bearing seats, tops of the second rotating shaft levers 4 are provided with regulating screws 401, the sliding rack 2 is slidably connected with first guide through slots 103 of the incubator 1 through the connecting blocks 202, the threaded sliding sleeves 203 sleeve the regulating screws 401, driven bevel gears 402 are arranged at bottoms of the second rotating shaft levers 4, and the driven bevel gears 402 are meshed with the driving bevel gears 302. The servo motor 3 provides force to drive the first rotating shaft lever 301 to rotate. The second rotating shaft lever 4 is driven to rotate through the transmission of the driving bevel gear 302 and the driven bevel gear 402. Through the mutual cooperation of the threaded sliding sleeve 203 and the regulating screw 401, the sliding rack 2 can be driven to slide up and down along the first guide through slot 103 to drive the planting basket 201 to be regulated up and down, so that the peony plants can be controlled to be put in and taken out water, thus the troubles of manually taking peony plants out of water and putting peony plants into water are omitted, and the water culture device for peony is simple in structure and convenient to use and operate.

Two limit sliding blocks 501 are arranged on opposite outer sides of the two regulating levers 5, the regulating levers 5 are slidably connected with the limit sliding chutes 102 of the limit frames 101 through the limit sliding blocks 501, two first limit round rods 502 are arranged on the opposite inner sides of the two regulating levers 5, first compression springs 503 sleeves the first limit round rods 502, sliding rods 504 are arranged on left and right sides of each of the first limit round rods 502, when the regulating levers 5 are in connection with the sliding rack 2, positions of the first limit round rods 502 correspond to positions of the limit sliding holes 204, the first compression springs 503 are supported between the regulating levers 5 and the sliding rack 2, and the first limit round rods 502 are slidably inserted in the sliding rack 2.

Two limit inserted rods 601 are arranged on one side of each of the locating clips 6, the two limit inserted rods 601 are symmetrically distributed, a second limit round rod 602 is arranged on the one side of the each of the locating clips 6, a second compression spring 603 sleeves the second limit round rod 602, the limit inserted rods 601 and the second limit round rod 602 slidably run through a corresponding one of the regulating levers 5 simultaneously, and the second compression spring 603 is supported between the each of the locating clips 6 and the corresponding one of the regulating levers 5. During the sliding rack 2 slides up and down, the two regulating levers 5 can be driven to slide up and down. Moreover, the incubator 1 is internally provided with a limit frame 101. In coordination with the structural features of the limit frame 101 and the limit sliding chute 102, the two regulating levers 5 can be folded towards the middle part when the two regulating levers 5 slide downwards. Through the mutual cooperation of the limit inserted rod 601 and the second compression spring 603 with the regulating lever 5, the peony plants can be stably clamped by the locating clips 6 on the front and rear sides, so that manual bundling and positioning of the peony plants is omitted, and the peony plants are ensured to be in a vertical state.

Since the locating clips 6 on the regulating levers 5 and the planting baskets 201 on the sliding rack 2 are used cooperatively, the peony plants can be accommodated and positioned. Moreover, a downward putting action of the planting basket 201 and a positioning and clamping action of the locating clip 6 are combined together and performed in one time through mechanical transmission, so that the trouble of stepwise operation is omitted, and the culture efficiency of peony plants is effectively promoted.

Embodiment II

Figure 7:
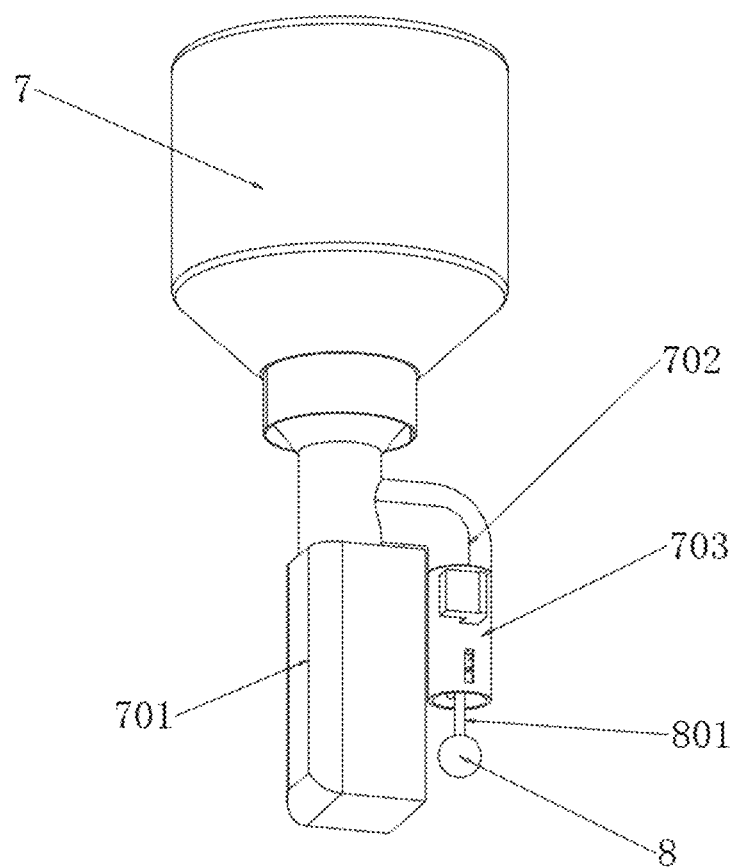
Figure 8:
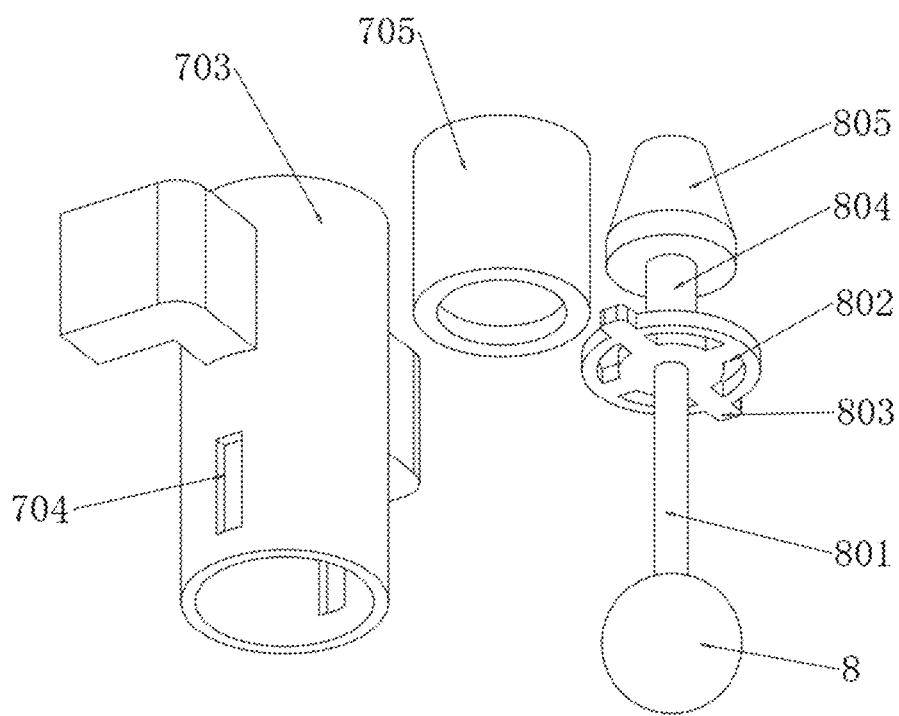
Figure 9:
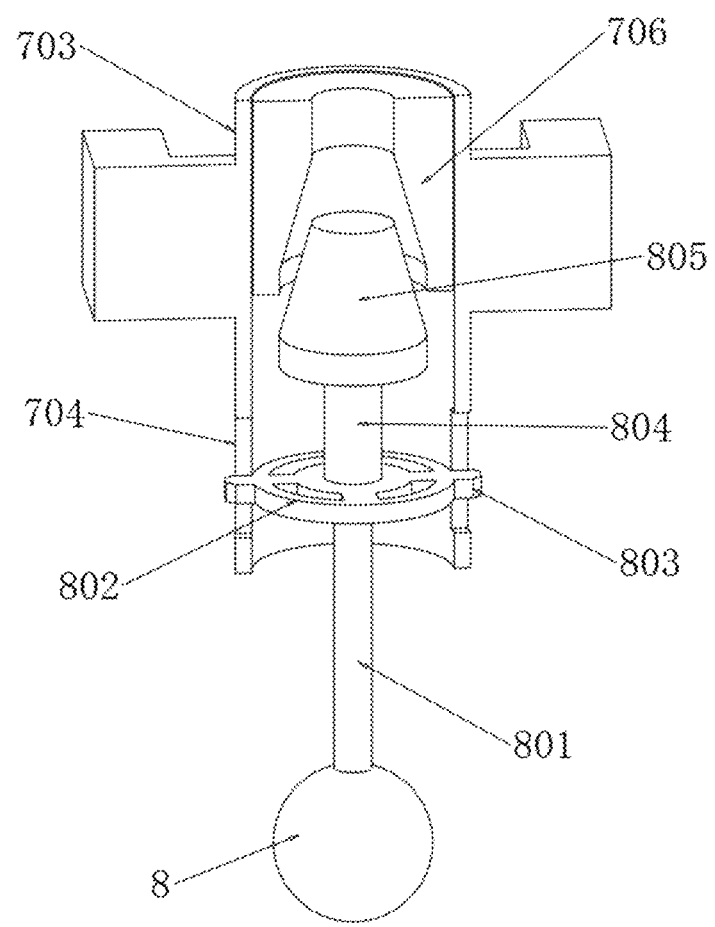

Referring to FIG. 7 to FIG. 9, a fixed seat 701 is arranged below the water storage barrel 7, the fixed seat 701 is fixedly connected with the incubator 1, a connecting water pipe 702 is arranged at a bottom of the water storage barrel 7, a water outlet pipe 703 is arranged at a bottom of the connecting water pipe 702, and a floating ball 8 is arranged below the water outlet pipe 703.

The water outlet pipe 703 is formed with a cylindrical through cavity, two second guide through slots 704 are formed in a side wall of the water outlet pipe 703, the two second guide through slots 704 are symmetrically distributed, the through cavity of the water outlet pipe 703 is internally provided with a butt sleeve 705, and the bottom of the butt sleeve 705 is formed with a conical cavity.

The floating ball 8 is provided with a connecting rod 801, a top of the connecting rod 801 is provided with a regulating round rack 802, two guide sliding blocks 803 are arranged on a periphery of the regulating round rack 802, the two guide sliding blocks 803 are symmetrically distributed, the regulating round rack 802 is arranged inside the water outlet pipe 703, the regulating round rack 802 is slidably connected with second guide through slots 704 through the guide sliding blocks 803, a top of the regulating round rack 802 is provided with a support pillar 804, a top of the support pillar 804 is provided with a butt plug 805, and the butt plug 805 is matched with the conical cavity of the butt sleeve 705. Since the floating ball 8 floats on the liquid surface of culture water, when the culture water inside the incubator 1 is reduced, the floating ball 8 can descend along with the liquid surface, so that the regulating round rack 802 slides downwards along the second guide through slot 704. At the same time, the butt plug 805 is separated from the conical cavity of the butt sleeve 705, so that the plugging of the butt sleeve 705 can be relieved to realize automatic water injection of the incubator 1 from the water storage barrel 7. The water volume inside the incubator 1 does not need to be monitored, and the trouble of manual water injection is omitted.

The specific implantation and functions of the embodiment are as follows. In the present disclosure, The servo motor 3 provides force to drive the first rotating shaft lever 301 to rotate. The second rotating shaft lever 4 is driven to rotate through the transmission of the driving bevel gear 302 and the driven bevel gear 402. Through the mutual cooperation of the threaded sliding sleeve 203 and the regulating screw 401, the sliding rack 2 can be driven to slide up and down along the first guide through slot 103 to drive the planting basket 201 to be regulated up and down, so that the peony plants can be controlled to be put in and taken out water, thus the troubles of manually taking peony plants out of water and putting peony plants into water are omitted, and the water culture device for peony is simple in structure and convenient to use and operate. Since the position of the first limit round rod 502 corresponds to the position of the limit sliding hole 204, the first compression spring 503 is supported between the regulating lever 5 and the sliding rack 2, and the first limit round rod 502 is slidably inserted in the sliding rack 2, the two regulating levers 5 can be driven to slide up and down during the sliding rack 2 slides up and down. Moreover, the incubator 1 is internally provided with a limit frame 101. In coordination with the structural features of the limit frame 101 and the limit sliding chute 102, the two regulating levers 5 can be folded towards the middle part when the two regulating levers 5 slide downwards. Through the mutual cooperation of the limit inserted rod 601 and the second compression spring 603 with the regulating lever 5, the peony plants can be stably clamped by the locating clips 6 on the front and rear sides, so that manual bundling and positioning of the peony plants is omitted, and the peony plants are ensured to be in a vertical state. Since the locating clips 6 on the regulating levers 5 and the planting baskets 201 on the sliding rack 2 are used cooperatively, the peony plants can be accommodated and positioned. Moreover, a downward putting action of the planting basket 201 and a positioning and clamping action of the locating clip 6 are combined together and performed in one time through mechanical transmission, so that the trouble of stepwise operation is omitted, and the culture efficiency of peony plants is effectively promoted. Since the floating ball 8 floats on the liquid surface of culture water, when the culture water inside the incubator 1 is reduced, the floating ball 8 can descend along with the liquid surface, so that the regulating round rack 802 slides downwards along the second guide through slot 704. At the same time, the butt plug 805 is separated from the conical cavity of the butt sleeve 705, so that the plugging of the butt sleeve 705 can be relieved to realize automatic water injection of the incubator 1 from the water storage barrel 7. The water volume inside the incubator 1 does not need to be monitored, and the trouble of manual water injection is omitted.

The above embodiments are only exemplary embodiments of the present disclosure, and are not intended to limit the present disclosure. The scope of protection of the present disclosure is defined by the claims.

What is claimed is:

1. A water culture device for peony, comprising an incubator (1), wherein the incubator (1) is internally provided with a sliding rack (2) at a middle position;
    a servo motor (3) is arranged on a right side of the incubator (1);
    two second rotating shaft levers (4) are arranged on left and right sides of the incubator (1), and the two second rotating shaft levers (4) are symmetrically distributed;
    the incubator (1) is internally provided with two regulating levers (5) which are located on front and rear sides of the sliding rack (2) respectively;
    each of the two regulating levers (5) comprises three locating clips (6) arranged on an inner side, and wherein the three locating clips (6) on each regulating lever (5) are symmetrically distributed;
    a back of the incubator (1) is provided with a water storage barrel (7);
    side frames (9) are arranged on the left and right sides of the incubator (1), and the second rotating shaft levers (4) are located inside the side frames (9);
    a bottom frame (10) is arranged at a bottom of the incubator (1), and the servo motor (3) is fixedly connected to the bottom frame (10) through bolts.

2. The water culture device for peony according to claim 1, wherein two limit frames (101) are arranged on inner walls of the left and right sides of the incubator (1), the two limit frames (101) are symmetrically distributed, limit sliding chutes (102) are arranged on opposite inner sides of the limit frames (101), first guide through slots (103) are formed in the left and right sides of the incubator (1), and the first guide through slots (103) are located at middle positions of the two limit frames (101).

3. The water culture device for peony according to claim 2, wherein three planting baskets (201) are arranged on the sliding rack (2), each of the planting baskets (201) is located below corresponding ones of the locating clips (6), connecting blocks (202) are arranged at left and right ends of the sliding rack (2), the two connecting blocks (202) are symmetrically distributed, threaded sliding sleeves (203) are arranged on ends of the connecting blocks (202), and limit sliding holes (204) are formed in portions, close to both ends, of the sliding rack (2).

4. The water culture device for peony according to claim 3, wherein a first rotating shaft lever (301) is arranged on a rotating shaft of the servo motor (3), the first rotating shaft lever (301) is located inside the bottom frame (10), the first rotating shaft lever (301) is rotatably connected with the bottom frame (10) through a bearing seat, two driving bevel gears (302) are arranged on the first rotating shaft lever (301), and the two driving bevel gears (302) are symmetrically distributed.

5. The water culture device for peony according to claim 4, wherein the second rotating shaft levers (4) are rotatably connected with the incubator (1) through bearing seats, tops of the second rotating shaft levers (4) are provided with regulating screws (401), the sliding rack (2) is slidably connected with first guide through slots (103) of the incubator (1) through the connecting blocks (202), the threaded sliding sleeves (203) sleeve the regulating screws (401), driven bevel gears (402) are arranged at bottoms of the second rotating shaft levers (4), and the driven bevel gears (402) are meshed with the driving bevel gears (302).

6. The water culture device for peony according to claim 3, wherein two limit sliding blocks (501) are arranged on opposite outer sides of the two regulating levers (5), the regulating levers (5) are slidably connected with the limit sliding chutes (102) of the limit frames (101) through the limit sliding blocks (501), two first limit round rods (502) are arranged on the opposite inner sides of the two regulating levers (5), first compression springs (503) sleeves the first limit round rods (502), sliding rods (504) are arranged on left and right sides of each of the first limit round rods (502), when the regulating levers (5) are in connection with the sliding rack (2), positions of the first limit round rods (502) correspond to positions of the limit sliding holes (204), the first compression springs (503) are supported between the regulating levers (5) and the sliding rack (2), and the first limit round rods (502) are slidably inserted in the sliding rack (2).

7. The water culture device for peony according to claim 1, wherein two limit inserted rods (601) are arranged on one side of each of the locating clips (6), the two limit inserted rods (601) are symmetrically distributed, a second limit round rod (602) is arranged on the one side of the each of the locating clips (6), a second compression spring (603) sleeves the second limit round rod (602), the limit inserted rods (601) and the second limit round rod (602) slidably run through a corresponding one of the regulating levers (5) simultaneously, and the second compression spring (603) is supported between the each of the locating clips (6) and the corresponding one of the regulating levers (5).

8. The water culture device for peony according to claim 1, wherein a fixed seat (701) is arranged below the water storage barrel (7), the fixed seat (701) is fixedly connected with the incubator (1), a connecting water pipe (702) is arranged at a bottom of the water storage barrel (7), a water outlet pipe (703) is arranged at a bottom of the connecting water pipe (702), and a floating ball (8) is arranged below the water outlet pipe (703).

9. The water culture device for peony according to claim 8, wherein the water outlet pipe (703) is formed with a cylindrical through cavity, two second guide through slots (704) are formed in a side wall of the water outlet pipe (703), the two second guide through slots (704) are symmetrically distributed, the through cavity of the water outlet pipe (703) is internally provided with a butt sleeve (705), and the bottom of the butt sleeve (705) is formed with a conical cavity.

10. The water culture device for peony according to claim 9, wherein the floating ball (8) is provided with a connecting rod (801), a top of the connecting rod (801) is provided with a regulating round rack (802), two guide sliding blocks (803) are arranged on a periphery of the regulating round rack (802), the two guide sliding blocks (803) are symmetrically distributed, the regulating round rack (802) is arranged inside the water outlet pipe (703), the regulating round rack (802) is slidably connected with second guide through slots (704) through the guide sliding blocks (803), a top of the regulating round rack (802) is provided with a support pillar (804), a top of the support pillar (804) is provided with a butt plug (805), and the butt plug (805) is matched with the conical cavity of the butt sleeve (705).

* * * * *